United States Patent
Kulkarni (10) Patent No.: US 10,742,613 B2
(45) Date of Patent: Aug. 11, 2020

(54) PLUGGABLE FRAMEWORK FOR AS4 ADAPTER GENERATION

(71) Applicant: SAP SE, Walldorf (DE)

(72) Inventor: Gopalkrishna Kulkarni, Bangalore (IN)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 15/962,138

(22) Filed: Apr. 25, 2018

(65) Prior Publication Data

US 2019/0334873 A1    Oct. 31, 2019

(51) Int. Cl.
*H04L 29/06* (2006.01)
*G06F 9/54* (2006.01)

(52) U.S. Cl.
CPC .............. *H04L 63/04* (2013.01); *G06F 9/547* (2013.01)

(58) Field of Classification Search
CPC ..... H04L 63/04; H04L 67/12; H04L 67/1097; G06F 9/547
See application file for complete search history.

(56) References Cited

U.S. PATENT DOCUMENTS

2004/0187095 A1* 9/2004 Gilfix .................. H04L 67/303
717/120

OTHER PUBLICATIONS

European Commission eDelivery PMode Configuration, European Commission Directorate-General informatics Digit.B.4 Information Systems for Corporate financial, procurement & Policy Solutions, Mar. 2016 (Year: 2016).*
("AS4 Profile of ebMS 3.0 Version 1.0," Oasis, Jan. 2013 (Year: 2013).*
EP Extended European Search Report in European Appln. No. 18178985, dated Oct. 26, 2018, 8 pages.
Durand et al., "AS4 Profile of ebMS 10 Version 1.0," Oasis, Jan. 2013, URL <http://docs.oasis-open.org/ebxml-msg/ebms/v3.0/profiles/AS4-profile/v1.0/os/AS4-profile-v1.0-os.odt>, 58 pages.

(Continued)

*Primary Examiner* — Yogesh Paliwal
(74) *Attorney, Agent, or Firm* — Fish & Richardson P.C.

(57) ABSTRACT

Methods, systems, and apparatus, including computer programs encoded on a computer storage medium, for generating an adapter for sending Applicability Statement 4 (AS4) profile compliant payloads. In one aspect, a method includes receiving a configuration script including parameters for an adapter for sending Applicability Statement 4 (AS4) profile compliant payloads to an agency; identifying a conformance client and at least one associated Processing Mode (P-Mode) based on the configuration script; identifying a response handler based on the configuration script, wherein the response handler is configured to receive and parse responses from the agency; generating the adapter to include the conformance client and the response handler, wherein the conformance client is associated with an authentication service, the authentication service determined based on the configuration script, and wherein the at least one P-Mode are populated based on the configuration script; and enabling the generated adapter for execution in a runtime environment.

20 Claims, 4 Drawing Sheets

(56) References Cited

OTHER PUBLICATIONS

Irvine et al., "European Commission eDelivery PMode Configuration," European Commission Directorate-General Informatics Digit. B.4 Information Systems for Corporate financial, procurement & Policy Solutions, Mar. 2016, URL <https://ec.europa.eu/cefdigital/tracker/secure/attachment/10790/eDeliveryPmodeConfiguraton%20v0.06.docx>, 92 pages.

Jones et al., "Oasis ebXML Messaging Services 3 Version 3.0: Part 1, Core Features 4 Oasis Standard Specificatio URIs: This Version: Declared XML Namespace," Oasis, Oct. 2007, URL <http://docs.oasis-open.org/ebxml-msg/ebms/v3.0/core/os/ebms_core3.0-spec-os.pdf>, 112 pages.

* cited by examiner

PLUGGABLE FRAMEWORK FOR AS4 ADAPTER GENERATION

BACKGROUND

Applicability Statement 4 (AS4) is a Conformance Profile of the Organization for the Advancement of Structured Information Standards (OASIS) Electronic Business using the Electronic Business Message Service (ebMS) specification 3.0. AS4 represents an open standard for the secure and payload-agnostic exchange of business-to-business and business-to-government documents using, for example, Web Services. OASIS defines the AS4 profile as a combination of conformance profiles that concern an implementation capability, and of a usage profile that concerns how to use the implementation. Example implementations include enterprise integration business software where the connectivity between different systems may be established through adapters that employ the AS4 profile. In some implementations, such adapters are hardware and/or software products that facilitate the integration of an application into a common unit.

SUMMARY

The present disclosure describes methods and systems, including computer-implemented methods, computer-program products, and computer systems for generating an adapter for sending AS4 profile compliant payloads.

In a general implementation, a computer-implemented method executed by one or more processors includes receiving a configuration script. The configuration script includes parameters for an adapter for sending AS4 profile compliant payloads to an agency. A conformance client and at least one associated Processing Mode (P-Mode) is identified based on the configuration script. A response handler is identified based on the configuration script, wherein the response handler is configured to receive and parse responses from the agency. The adapter is generated to include the conformance client and the response handler, wherein the conformance client is associated with an authentication service, the authentication service determined based on the configuration script, and wherein the at least one P-Mode are populated based on the configuration script. The generated adapter is enabled for execution in a runtime environment.

In another general implementation, one or more non-transitory computer-readable storage media coupled to one or more processors and having instructions stored thereon which, when executed by the one or more processors, cause the one or more processors to perform operations that include receiving a configuration script. The configuration script includes parameters for an adapter for sending AS4 profile compliant payloads to an agency. A conformance client and at least one associated P-Mode is identified based on the configuration script. A response handler is identified based on the configuration script, wherein the response handler is configured to receive and parse responses from the agency. The adapter is generated to include the conformance client and the response handler, wherein the conformance client is associated with an authentication service, the authentication service determined based on the configuration script, and wherein the at least one P-Mode are populated based on the configuration script. The generated adapter is enabled for execution in a runtime environment.

In yet another general implementation, a system includes one or more processors; and a computer-readable storage device coupled to the one or more processors and having instructions stored thereon which, when executed by the one or more processors, cause the one or more processors to perform operations that include receiving a configuration script. The configuration script includes parameters for an adapter for sending AS4 profile compliant payloads to an agency. A conformance client and at least one associated P-Mode is identified based on the configuration script. A response handler is identified based on the configuration script, wherein the response handler is configured to receive and parse responses from the agency. The adapter is generated to include the conformance client and the response handler, wherein the conformance client is associated with an authentication service, the authentication service determined based on the configuration script, and wherein the at least one P-Mode are populated based on the configuration script. The generated adapter is enabled for execution in a runtime environment.

In an aspect combinable with the general implementations, an integration adapter runtime component that is specific to the runtime environment is identified based on the configuration script and the generated adapter is enabled for execution in the runtime environment by integrating the integration adapter runtime component into the generated adapter.

In an aspect combinable with any of the previous aspects, the adapter is generated to employ a compression protocol defined according to the configuration script to send the AS4 profile compliant payloads to the agency.

In an aspect combinable with any of the previous aspects, the adapter is generated to include a custom payload parser for the conformance client, wherein a location of the custom payload parser is provided through the configuration script.

In an aspect combinable with any of the previous aspects, the adapter is executed in a runtime environment to send the AS4 profile compliant payloads to the agency and receive the respective responses from the agency through the response handler.

In an aspect combinable with any of the previous aspects, the conformance client is a core conformance client, light conformance client, or a minimal conformance client defined according to the AS4 profile.

In an aspect combinable with any of the previous aspects, the authentication service is a basic authentication service, a certificate based authentication service, or a Security Assertion Markup Language (SAML) authentication service defined according to the AS4 profile.

In an aspect combinable with any of the previous aspects, the authentication service includes a custom authentication service, wherein a location of the custom authentication service is provided through the configuration script.

In an aspect combinable with any of the previous aspects, the configuration script is identified through a user interface.

In an aspect combinable with any of the previous aspects, the agency is a governmental agency.

Implementations include systems and processes for a framework to generate adapters for sending AS4 profile compliant payloads. Particular implementations of the subject matter described in this disclosure can be implemented so as to realize one or more of the following advantages. This described framework decreases development time while increasing the maintainability of the generated AS4-compliant adapters. This described framework also increases re-usability, and thus reduces storage required for different conformance implementations.

The details of one or more implementations of the subject matter of this specification are set forth in the accompanying drawings and the later description. Other features, aspects, and advantages of the subject matter will become apparent from the description, the drawings, and the claims.

DETAILED DESCRIPTION

This disclosure generally describes example systems and methods for the generation of AS4-compliant adapters. The disclosure is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described or illustrated implementations, but is to be accorded the widest scope consistent with the principles and features disclosed herein.

Variations of the AS4 specification include AS4 light client conformance profile, the AS4 minimal client conformance profile, and AS4 conformance profiles for ebMS version 3 (V3) core specification, among others. These variations allow for multiple and varying implementations of the ebMS protocol, and provide support for differing provider implementations and/or data formats. For example, reception awareness of a specification by a particular agency may provide basic information in a flat-file or similar structure whereas a different agency may provide similar information in an Extensible Markup Language (XML) structure. Accordingly, AS4-compliant solutions to address such differences may involve the creation and maintenance of multiple implementations. The generation, configuration, and maintenance of a multitude of implementations can become complicated as the number of supported variations of the AS4 specification increases. Additionally, other factors, such as the type and variations of security handling, response handling, and so forth, may also increase this complexity.

In view of the foregoing, and as described in further detail herein, implementations of the present disclosure provide a framework system to provide modules (e.g., adapters) that conform to the AS4 profile. The described framework system decreases development timelines while providing a robust toolset for the development of such AS4 profile conforming adapters. For example, various components can be plugged into the described framework system by using a simple domain specific language and programming interface contracts to which implementations must adhere. The provided adapters may be built to handle different protocols, such as Hypertext Transfer Protocol (HTTP), Java Database Connectivity (JDBC), and Simple Object Access Protocol (SOAP).

Figure 1:
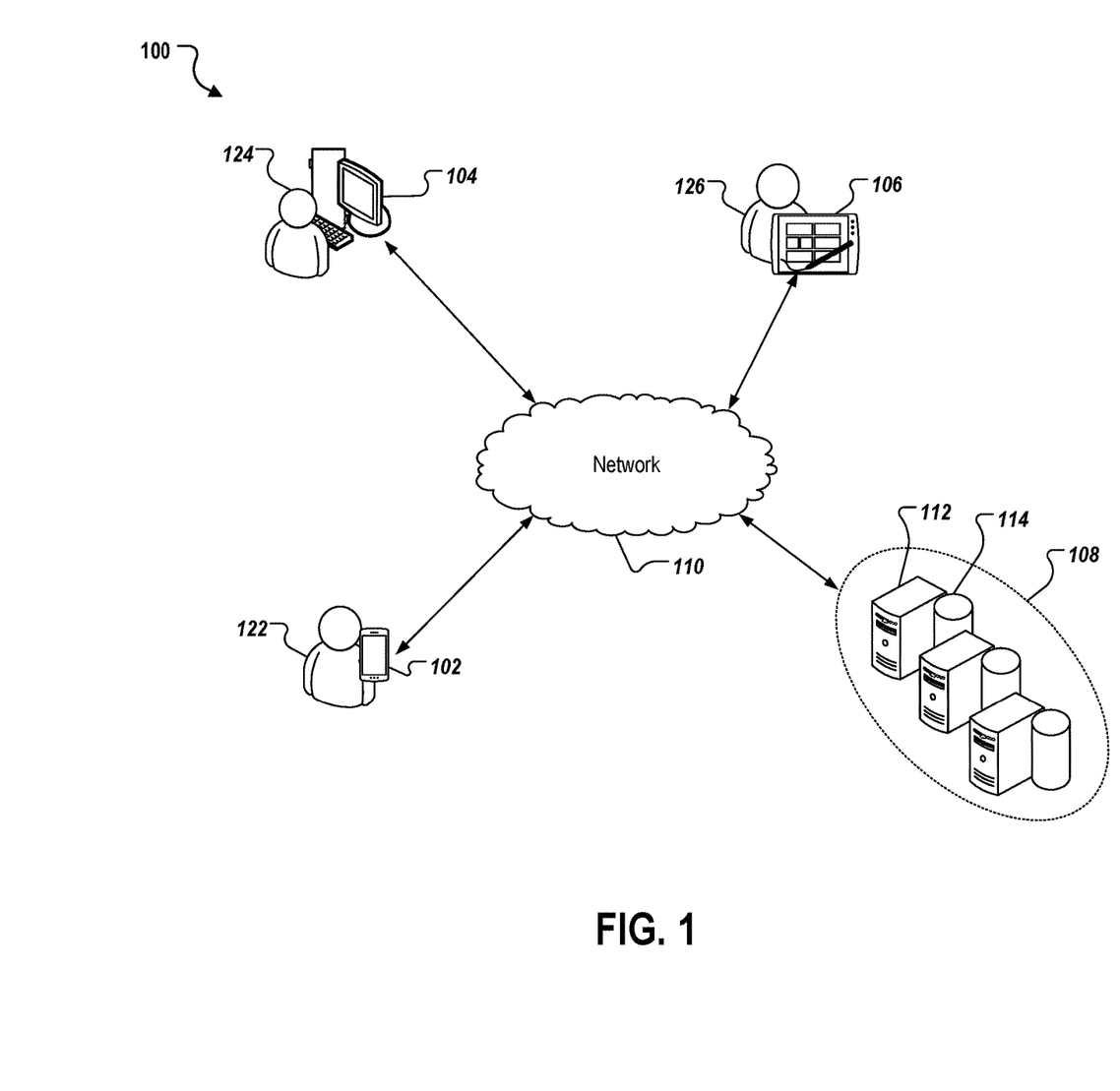
FIG. 1 depicts an example environment that can be employed to execute implementations of the present disclosure.

FIG. 1 depicts an example environment 100 that can be employed to execute implementations of the present disclosure. The example system 100 includes computing devices 102, 104, 106, a back-end system 108, and a network 110. In some implementations, the network 110 includes a local area network (LAN), wide area network (WAN), the Internet, or a combination thereof, and connects web sites, devices (e.g., the computing devices 102, 104, 106) and back-end systems (e.g., the back-end system 108). In some implementations, the network 110 can be accessed over a wired and/or a wireless communications link. For example, mobile computing devices (e.g., the smartphone device 102 and the tablet device 106), can use a cellular network to access the network 110.

In the depicted example, the back-end system 108 includes at least one server system 112 and a data store 114. In some implementations, the at least one server system 112 hosts one or more computer-implemented services, such as implementations of the described framework and any respective user interfaces (UI), that users 122-126 can interact with using the respective computing devices 102-106. For example, the computing devices 102-106 used by respective users 122-126 to interact with a framework implementation are hosted by the back-end system 108 through an application programming interface (API) to generate various AS4 adapters. In some implementations, back-end system 108 includes computer systems using clustered computers and components to act as a single pool of seamless resources when accessed through the network 110. For example, such implementations may be used in data center, cloud computing, storage area network (SAN), and network attached storage (NAS) applications. In some implementations, back-end system 108 is deployed using a virtual machine(s).

The computing devices 102, 104, and 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is provided as a smartphone, the computing device 104 is provided as a desktop computing device, and the computing device 106 is provided as a tablet-computing device. It is contemplated, however, that implementations of the present disclosure can be realized with any of the appropriate computing devices, such as those mentioned previously.

Figure 2:
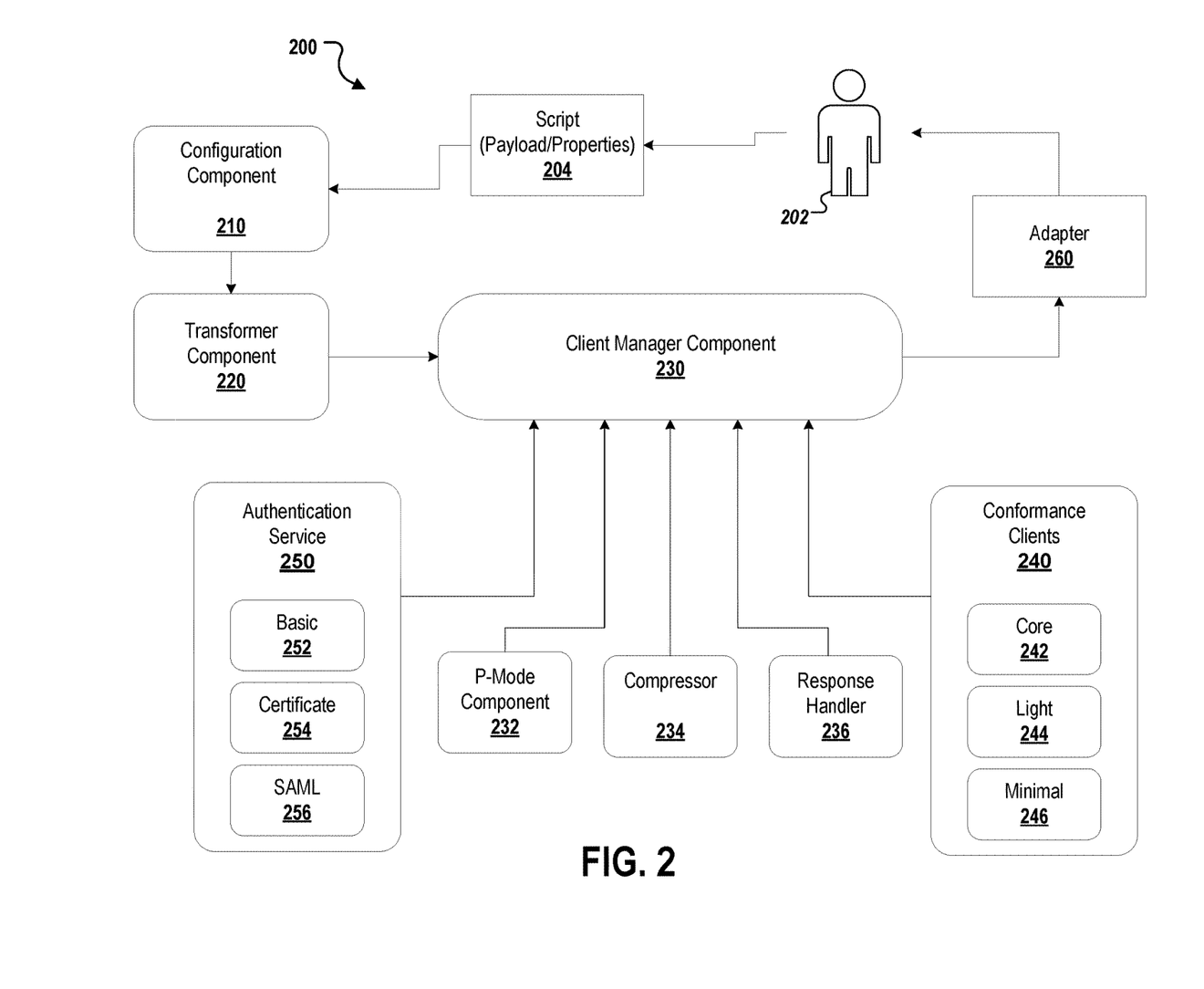
FIG. 2 depicts an example adapter-generation framework of the described system.

FIG. 2 depicts an example adapter-generation framework 200 of the described system that can be employed to create client-specific implementations of AS4-compliant adapters 260, such as, for example, an AS4 Message Service Handler (MSH) client. The adapters are then used to deliver payloads (e.g., message) to agencies. Such agencies may include government and/or business organizations that are the receiving parties for the generated adapters 260. As depicted, the example framework 200 includes configuration component 210, transformer component 220, and client-manager component 230. In some implementations, the user (e.g., a developer) 202 of the adapter-generation framework 200 may generate the AS4-compliant adapter 260 with default implementations or by providing additional component implementations.

The adapter-generation framework 200 may be employed by the developer 202 to generate the adapter 260. For example, client-manager component 230 may be executed with a payload and user configuration properties defined within the configuration component 210. The payload is the message to be sent to an agency for which the adapter 260 is to be generated and the user configuration properties include the defined AS4 MSH properties required for the selected conformance client 240. The appropriate required P-Modes are retrieved from the P-Mode component 232. P-Modes define the set of features required by the AS4 profile for end-to-end message flow for the specific conformance policy. The retrieved P-Modes are populated based on the user configuration properties. A compression service and response handler are identified based on the requirements of the respective agency. To generate the adapter 260, the appropriate conformance client 240 and authentication service 250 are identified. The generated adapter 260 is then executed in the appropriate runtime environment. When executed, the adapter may, for example, call a web service to send a payload using an AS4 complaint MSH to the respective agency. The adapter 260 may then call the identified response handler to receive the response from the agency. The adapter 260 may then send back, for example, a SOAP response or throw a SOAP fault.

The developer 202 provides the configuration component 210 with a configuration script 204 through, for example, a UI. A configuration script 204 may include specifications for an adapter 260 to be generated by the framework 200. These specifications can include various user configuration properties required by the generated adapter 260 and/or custom component implementations for the adapter 260, for the messages to be generated by the adapter 260 and delivered to the respective agency. For example, custom implementation classes can be made available in the runtime execution environment for the adapter 260 once generated by the adapter-generation framework 200. Payloads may include, for example, employee data in XML or text format.

In some implementations, the transformer component 220 receives the script 204 provided by the configuration component 210 and generates an integration adapter runtime component to be used by the respective adapter 260 once generated. In some implementations, an integration adapter runtime component is specific to the runtime environment for a particular adapter 260. For example, for adapters 260 generated for Systems, Applications, and Products in Data Processing (SAP) Cloud Platform Integration (CPI), the runtime component is an Apache™ Camel component.

In some implementations, the client-manager component 230 receives the configuration script 204 provided by the developer 202 and any respective integration adapter runtime component generated by the transformer client 220. The client-manager component 230 functions as the orchestrator of the adapter-generation framework 200. For example, the client-manager component 230 holds reference to the conformance clients 240 for the various agencies supported by the framework. Each agency may define a specification how information should be communicated. The AS4 specification defines three basic conformance profiles: ebHandler (core), light client, and minimal client. These basic profiles can be extended with the AS4 Multi-Hop Endpoint Conformance Clause to add support for multi-hop messaging. Each of the defined conformance clients converts a provided payload 204 to an AS4-compliant message that also adheres to the defined specification for a respective agency.

As depicted in FIG. 2, conformance clients 240 may include three standard implementations of conformance defined according to the AS4 specification profiles: core conformance clients 242, light clients 244, and minimal clients 246. When using the adapter-generation framework 200 the developer 202 may select one of these particular conformance clients to be employed by the generated adapter 260 through the provided configuration script 204. Each of the conformance clients' standard implementations (242, 244, and 246) also provide a mechanism for custom code to be implemented within the particular conformance client, such as a custom payload parser. The services provided by a conformance client may employ an authentication service 250 (described below) and/or security settings as provided in the configuration component 210 to construct, for example, an AS4 Message and/or to make web service calls.

For each conformance profile (e.g., core, light client, and minimal client), the AS4 specification defines a required set of P-Mode Parameters. Once a conformance client 240 has been selected for the adapter 260, the P-Mode component 232 provides the P-Mode parameters for the selected component. Likewise, the developer 202 may select a compression protocol/service, for example gzip, from the compressor component 234 for the adapter 260 to employ while sending AS4-compliant messages to the respective agency. The response handler component 236 provides modules for the generated adapter 260 to parse the information received from the respective agency. The developer 202 may also select the appropriate response handler for the respective agency serviced by the generated adapter 260 through the provided configuration script 204.

In some implementations, the authentication service 250 holds reference to standard authentication services and custom services, if there are any implemented by the developer 202. These services are categorized according to the three types of authentication defined by the AS4 profile, which are represented as basic authentication component 252, certificate component 254, and SAML authentication component 256. Basic authentication component 252 includes services to support, for example, username and password-type authentication. Certificate component 254 includes services to support the use of digital certificates to identify users, machines, or devices before granting access to a resource, network, application, and so forth. SAML authentication component 256 includes services to support SAML based single sign-on (SSO). SAML is an XML-based framework for authentication and authorization between two entities: a service provider and an identity provider. The service provider agrees to trust the identity provider to authenticate users. In return, the identity provider generates an authentication assertion, which indicates that a user has been authenticated. Once selected for a generated adapter 260, the authentication service invokes an appropriate authentication service based on the entry defined in the configuration component 210.

Below are sample configurations that may be read by the adapter-generation framework 200. The examples are provided in XML, but the configuration data may be in any suitable format.

The examples shown are for Java specific examples. Users of the adapter-generation framework 200 may provide custom handler and runtime components (e.g., Java classes) available in the class path.

Example 1 (below) provides parameters for a light client conformance adapter with a custom response handler.

```
<AS4Client conformance>
    <ConformanceClient>Light Client </ ConformanceClient>
    <PModeParameters>standard</PModeParameters>
    <ResponseHandler>com.dummy.MyResponseHandler.Java<
    ResponseHandler>
</AS4Client conformance>
```

For the above configuration XML, the light client adapter will use the default behavior of the specification (sequence of statement execution), but it will call the custom ResponseHandler after making a call to the back-end.

Assuming the framework is implemented in Java, the developer 202 can make AS4 calls as defined bellow:

```
AS4Client = AS4ClientFractory.getClientInstance(dsl);
//The 'dsl' is the string representation of the above DSL example
as4Client.setPayload(payload);
// payload can be of any Java type like InputStream or String
as4Client.setAuthentication("user=sdfdsffdd,pwd='1232sfdafasd'");
//AS4Response response = as4Client.execute(AS4Client.PUSH);
```

Example 2 (below) provides parameters for a light client conformance adapter with a custom response handler and SAML authentication. The example also provides an override for the default P-Mode parameter 'Security.SendReceip' (e.g., when the developer 202 does not want backend to send the receipt).

```
<AS4Client conformance>
    <ConformanceClient>Light Client </ ConformanceClient>
    <PModeParameters>
        <Security.SendReceipt>false</Security.SendReceipt>
    </PModeParameters>
    <Authentication>
        <AuthenticationMethod>SAML</AuthenticationMethod>
        <IdentityProviderUrl>userPram:identityUrl</IdentityProviderUrl>
        <keyAlias>userParam:keyAlias</keyAlias>
    </ Authentication>
    <ResponseHandler>com.dummy.MyResponseHandler.Java<
    ResponseHandler>
</AS4Client conformance>
```

Here, the developer 202 requests a light client adapter from the described adapter-generation framework 200. For this example, the light client adapter will override the default value of P-Mode 'Security. SendReceipt' as false and will call the custom ResponseHandler after making a call to the backend.

Assuming the framework is implemented in Java, the developer 202 can make AS4 calls as defined bellow:

```
AS4Client as4Client = AS4ClientFractory.getClientInstance(dsl);
//The 'dsl' is the string representation of the above DSL example
as4Client.setPayload(payload);
// payload can be of any Java type like InputStream or String
AS4Response response = as4Client.execute(AS4Client.PUSH);
```

Example 3 (below) provides parameters with a new implementation of a specific client. Such a client may be employed, for example, when there is a requirement for custom implementations of the Message Exchange Patterns (MEPs) PUSH and/or PULL. One such custom implementation may include a Plain Old Java Object (POJO) implementation, which is provided in the configuration component 210.

```
<AS4Client conformance>
    <ConformanceClient>Custom</ ConformanceClient>
    <CustomClient>
        <MSHHandler>com.custom.MSHHandler.Java</Security.SendReceipt>
    </CustomClient>
    <ResponseHandler>com.dummy.MyResponseHandler.Java<
ResponseHandler>
</AS4Client conformance>
```

Here, com.custom.MSHHandler is the class containing the developer's 202 implementation.

Assuming the framework is implemented in Java, the developer 202 can make AS4 calls as bellow.

```
AS4Client = AS4ClientFractory.getClientInstance(dsl);
//The 'dsl' is the string representation of the above DSL example
as4Client.setPayload(payload);
// payload can be of any Java type like InputStream or String
AS4Response response = as4Client.execute(AS4Client.PUSH);
```

Figure 3:
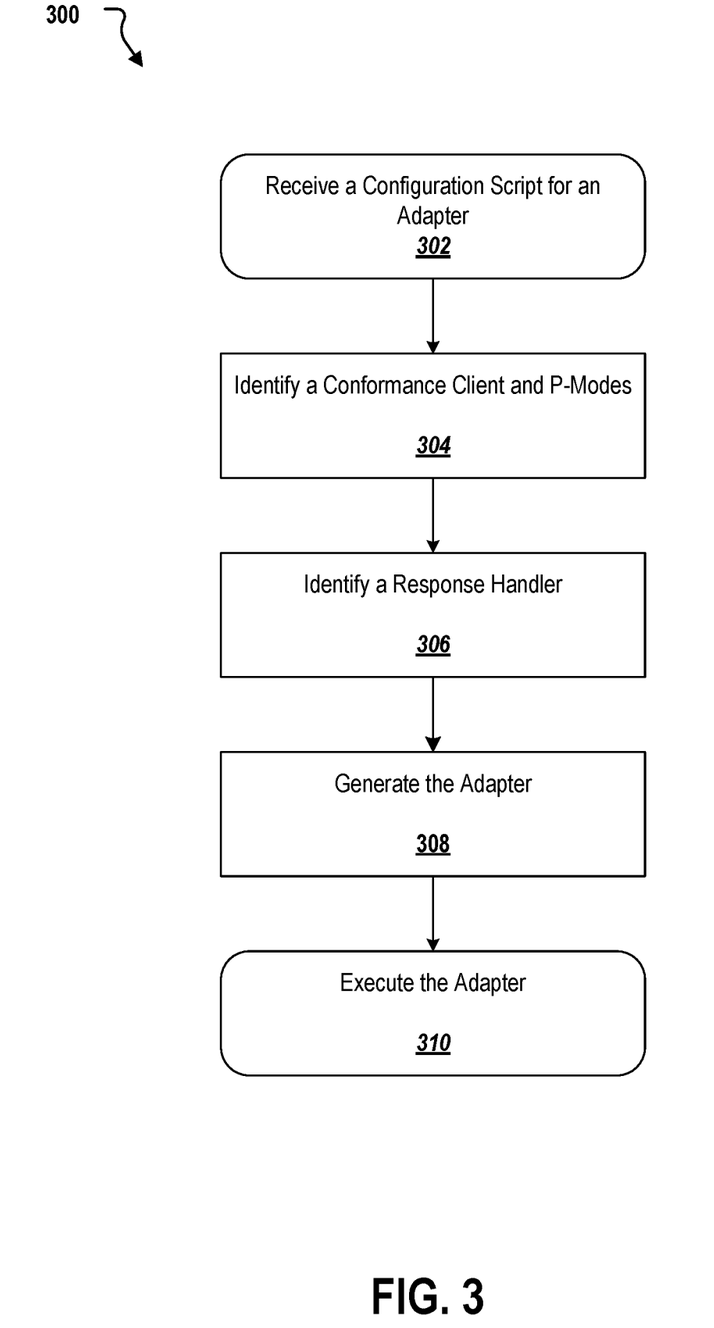
FIG. 3 depicts a flow diagram of an example process employed to generate and execute an AS4-compliant adapter.

FIG. 3 depicts a flow diagram of an example process 300 employed to generate and execute an AS4-compliant adapter. For clarity of presentation, the description that follows generally describes method 300 in the context of FIGS. 1-2 and 4. However, it will be understood that method 300 may be performed, for example, by any other suitable system, environment, software, and hardware, or a combination of systems, environments, software, and hardware as appropriate. In some implementations, various operations of method 300 can be run in parallel, in combination, in loops, or in any order.

At 302, a configuration script is received through, for example, an UI. The configuration script includes parameters for an adapter for sending Applicability Statement 4 (AS4) profile compliant payloads to an agency, such as, for example, a governmental agency. In some implementations, the configuration script includes an example payload to be delivered by the adapter to the agency. From 302, the process 300 proceeds to 304.

At 304, a conformance client and associated P-Modes are identified based on the configuration script. In some implementations, the conformance client is a core conformance client, a light conformance client, or a minimal conformance client as defined by the AS4 profile. From 304, the process 300 proceeds to 306.

At 306, a response handler is identified based on the configuration script. The response handler is configured to receive and parse responses from the agency. From 306, the process 300 proceeds to 308.

At 308, the adapter is generated to include the conformance client and the response handler. To generate the adapter, the P-Modes identified for the conformance client are populated based on the configuration script. An authentication service for the conformance client is also determined based on the configuration script. In some implementations, the authentication service is a basic authentication service, a certificate based authentication service, or an SAML authentication service defined according to the AS4 profile. In some implementations, the authentication service includes a custom authentication service. A location of the authentication service may be provided through the configuration script. In some implementations, the adapter is generated to include an integration adapter runtime component that is specific to a runtime environment and identified based on the configuration script. In some implementations, the adapter is generated to employ a compression protocol defined according to the configuration script to send the AS4 profile compliant payloads to the agency. In some implementations, the adapter is generated to include a custom payload parser for the conformance client. A location of the custom payload parser may be provided through the configuration script. From 308, the process 300 proceeds to 310.

At 310, the adapter is executed in a runtime environment to send the AS4 profile compliant payloads to the agency and receive the respective responses from the agency through the response handler. From 310, the process 300 ends.

Figure 4:
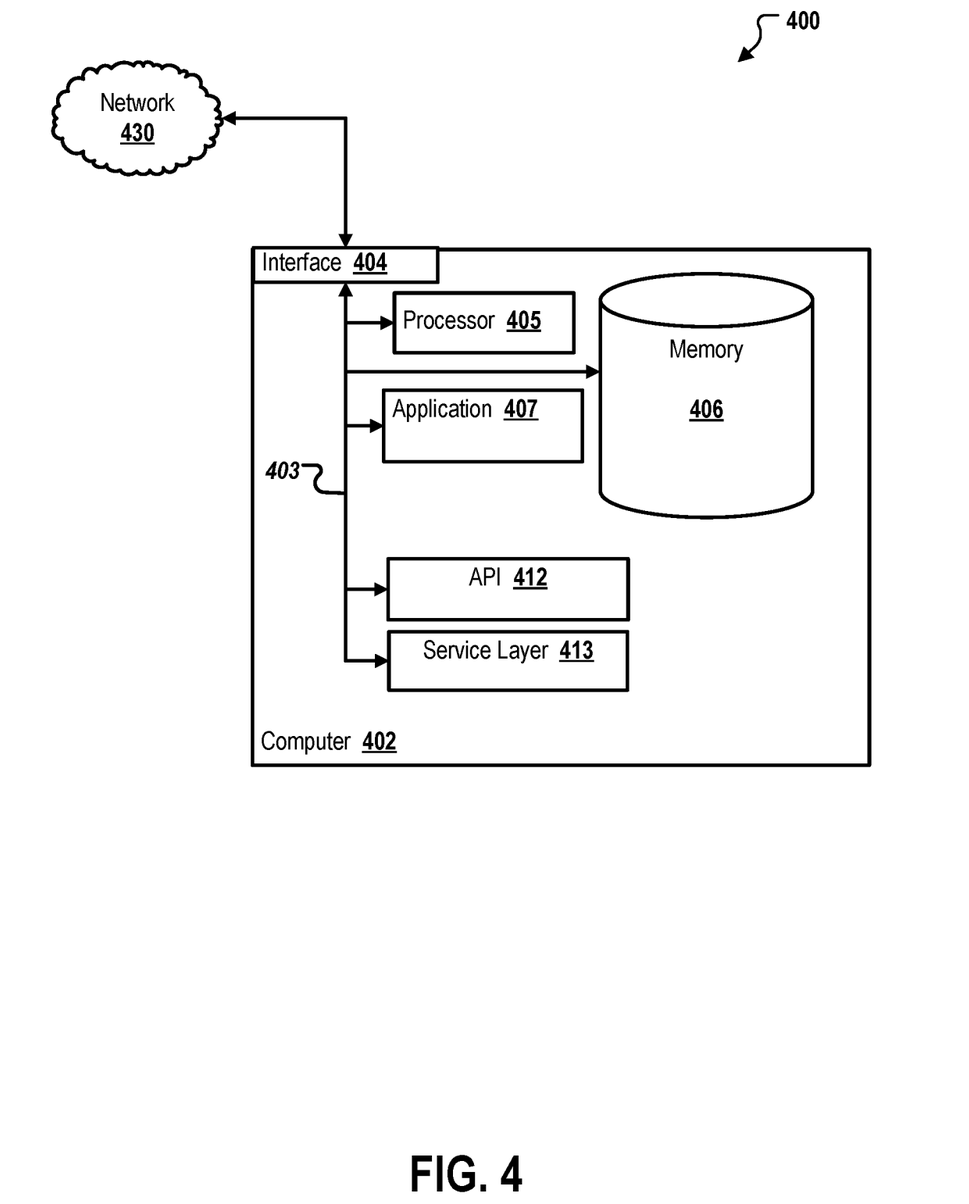
FIG. 4 depicts a block diagram of an exemplary computer system used to provide computational functionalities associated with described algorithms, methods, functions, processes, flows, and procedures as described in the instant disclosure, according to an implementation.

FIG. 4 depicts a block diagram of an exemplary computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop or notebook computer, wireless data port, smart phone, PDA, tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and respond to the received requests by processing the said requests in an appropriate software application. In addition, requests may also be sent to the computer 402 from internal users (for example, from a command console or by other appropriate access methods), external or third parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an API 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in XML format or other suitable formats. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure.

Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system that includes computer 402, with each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatuses, devices, and machines for processing data, including by way of example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware-based or software-based (or a combination of both). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a PDA, a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), DVD+/−R, digital versatile disc (DVD)-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term GUI may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of UI elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a LAN, a radio access network (RAN), a metropolitan area network (MAN), a WAN, Worldwide Interoperability for Microwave Access (WI-MAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in XML format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method executed by one or more processors, the method comprising:
   receiving a configuration script including parameters for an adapter for sending Applicability Statement 4 (AS4) profile compliant payloads to an agency;
   identifying a conformance client and at least one associated Processing Mode (P-Mode) based on the configuration script;
   identifying a response handler based on the configuration script, wherein the response handler is configured to receive and parse responses from the agency;
   generating the adapter to include the conformance client and the response handler, wherein the conformance client is associated with an authentication service, the authentication service determined based on the configuration script, and wherein the at least one P-Mode are populated based on the configuration script; and
   enabling the generated adapter for execution in a runtime environment.

2. The method of claim 1, further comprising:
   identifying an integration adapter runtime component that is specific to the runtime environment based on the configuration script, wherein enabling the generated adapter for execution in the runtime environment includes integrating the integration adapter runtime component into the generated adapter.

3. The method of claim 1, further comprising:
   generating the adapter to employ a compression protocol defined according to the configuration script to send the AS4 profile compliant payloads to the agency.

4. The method of claim 1, further comprising:
   generating the adapter to include a custom payload parser for the conformance client, wherein a location of the custom payload parser is provided through the configuration script.

5. The method of claim 1, further comprising:
   executing the adapter in a runtime environment to send the AS4 profile compliant payloads to the agency and receive the respective responses from the agency through the response handler.

6. The method of claim 1, wherein the conformance client is a core conformance client, light conformance client, or a minimal conformance client defined according to the AS4 profile.

7. The method of claim 1, wherein the authentication service is a basic authentication service, a certificate based authentication service, or a Security Assertion Markup Language (SAML) authentication service defined according to the AS4 profile.

8. The method of claim 1, wherein the authentication service includes a custom authentication service, wherein a location of the custom authentication service is provided through the configuration script.

9. The method of claim 1, wherein the configuration script is identified through a user interface.

10. The method of claim 1, wherein the agency is a governmental agency.

11. One or more non-transitory computer-readable storage media coupled to one or more processors and having instructions stored thereon which, when executed by the one or more processors, cause the one or more processors to perform operations comprising:
    receiving a configuration script including parameters for an adapter for sending Applicability Statement 4 (AS4) profile compliant payloads to an agency;
    identifying a conformance client and at least one associated Processing Mode (P-Mode) based on the configuration script;
    identifying a response handler based on the configuration script, wherein the response handler is configured to receive and parse responses from the agency;
    generating the adapter to include the conformance client and the response handler, wherein the conformance client is associated with an authentication service, the authentication service determined based on the configuration script, and wherein the at least one P-Mode are populated based on the configuration script; and
    enabling the generated adapter for execution in a runtime environment.

12. The one or more non-transitory computer-readable storage media of claim 11, wherein the operations further comprise:
    identifying an integration adapter runtime component that is specific to the runtime environment based on the configuration script, wherein enabling the generated adapter for execution in the runtime environment includes integrating the integration adapter runtime component into the generated adapter.

13. The one or more non-transitory computer-readable storage media of claim 11, wherein the operations further comprise:
    generating the adapter to employ a compression protocol defined according to the configuration script to send the AS4 profile compliant payloads to the agency.

14. The one or more non-transitory computer-readable storage media of claim 11, wherein the operations further comprise:
    generating the adapter to include a custom payload parser for the conformance client, wherein a location of the custom payload parser is provided through the configuration script.

15. The one or more non-transitory computer-readable storage media of claim 11, wherein the operations further comprise:
    executing the adapter in a runtime environment to send the AS4 profile compliant payloads to the agency and receive the respective responses from the agency through the response handler.

16. A system, comprising:
one or more processors; and
a computer-readable storage device coupled to the one or more processors and having instructions stored thereon which, when executed by the one or more processors, cause the one or more processors to perform operations comprising:
    receiving a configuration script including parameters for an adapter for sending Applicability Statement 4 (AS4) profile compliant payloads to an agency;
    identifying a conformance client and at least one associated Processing Mode (P-Mode) based on the configuration script;
    identifying a response handler based on the configuration script, wherein the response handler is configured to receive and parse responses from the agency;
    generating the adapter to include the conformance client and the response handler, wherein the conformance client is associated with an authentication service, the authentication service determined based on the configuration script, and wherein the at least one P-Mode are populated based on the configuration script; and
    enabling the generated adapter for execution in a runtime environment.

17. The system of claim 16, wherein the conformance client is a core conformance client, light conformance client, or a minimal conformance client defined according to the AS4 profile.

18. The system of claim 16, wherein the authentication service is a basic authentication service, a certificate based authentication service, or a Security Assertion Markup Language (SAML) authentication service defined according to the AS4 profile.

19. The system of claim 16, wherein the authentication service includes a custom authentication service, wherein a location of the custom authentication service is provided through the configuration script.

20. The system of claim 16, wherein the configuration script is identified through a user interface.

* * * * *